(No Model.) 13 Sheets—Sheet 1.

McCLINTOCK YOUNG,
BRUSH MACHINE.

No. 578,907. Patented Mar. 16, 1897.

WITNESSES:

INVENTOR (No Model.) 13 Sheets—Sheet 4.

McCLINTOCK YOUNG.
BRUSH MACHINE.

No. 578,907. Patented Mar. 16, 1897.

WITNESSES:
Arthur Ashley
F. S. Elmire

INVENTOR
McC. Young
BY
P. T. Dodge
ATTORNEY

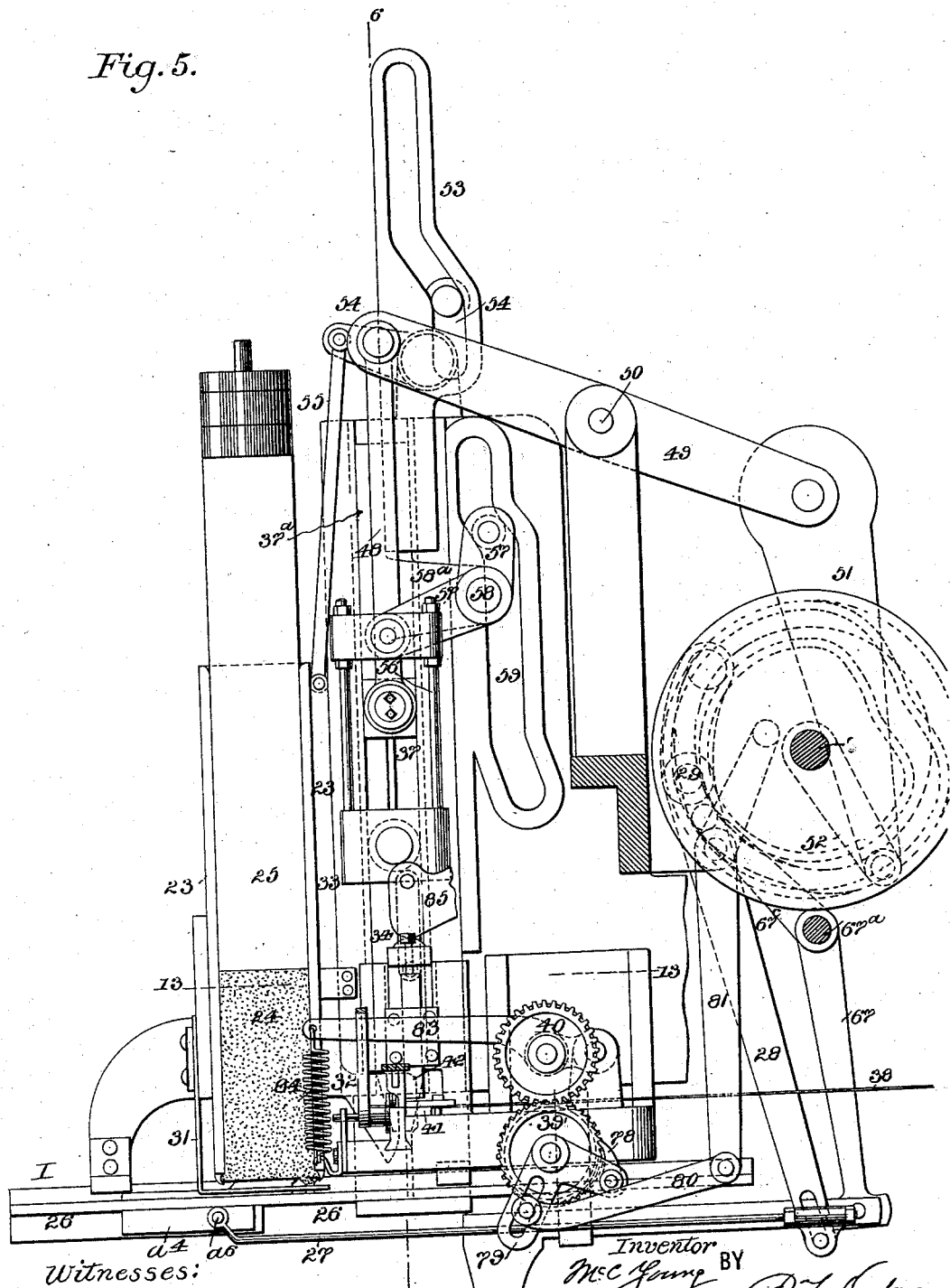

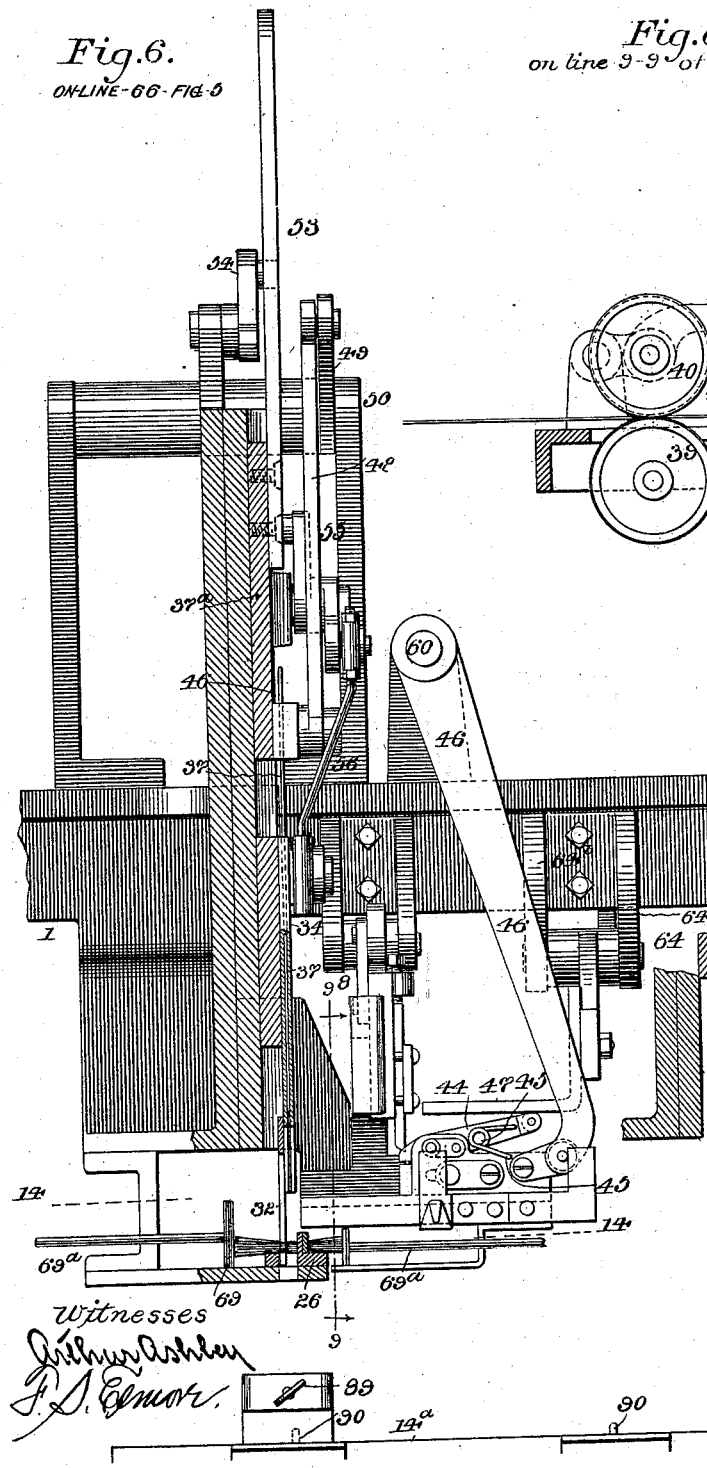

(No Model.)
McCLINTOCK YOUNG.
BRUSH MACHINE.
No. 578,907.
13 Sheets—Sheet 7.
Patented Mar. 16, 1897.
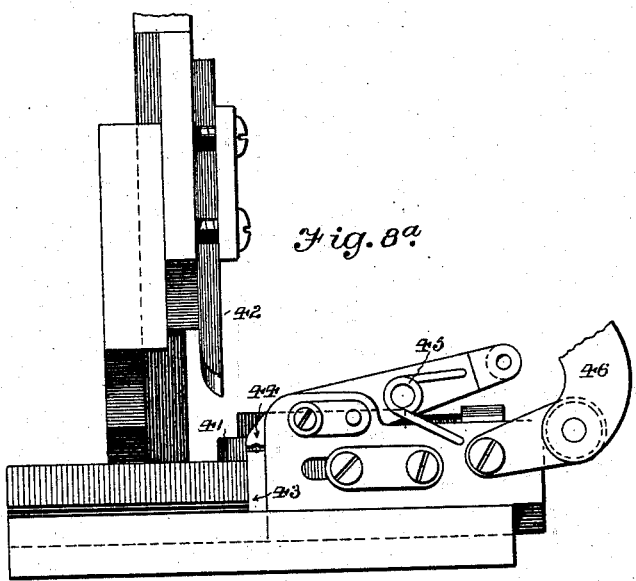
Fig. 8ª.
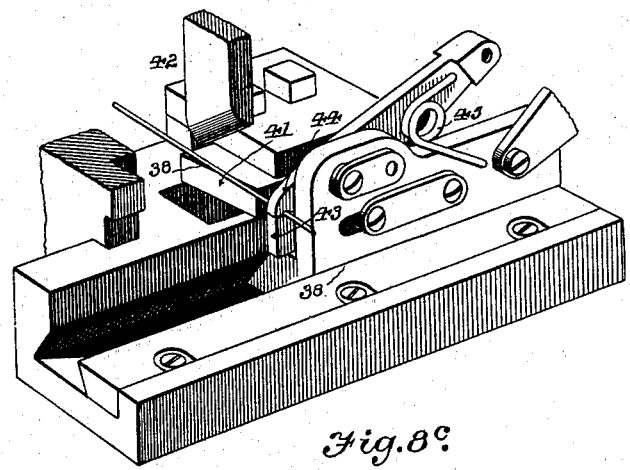
Fig. 8ᵇ.
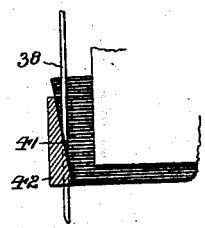
Fig. 8ᶜ.
WITNESSES:
Arthur Ashley
L. M. Lamb
INVENTOR
McClintock Young
BY
P. T. Dodge
ATTORNEY.
THE NORRIS PETERS CO., PHOTO-LITHO., WASHINGTON, D. C.

(No Model.) 13 Sheets—Sheet 8.
McCLINTOCK YOUNG.
BRUSH MACHINE.
No. 578,907. Patented Mar. 16, 1897.
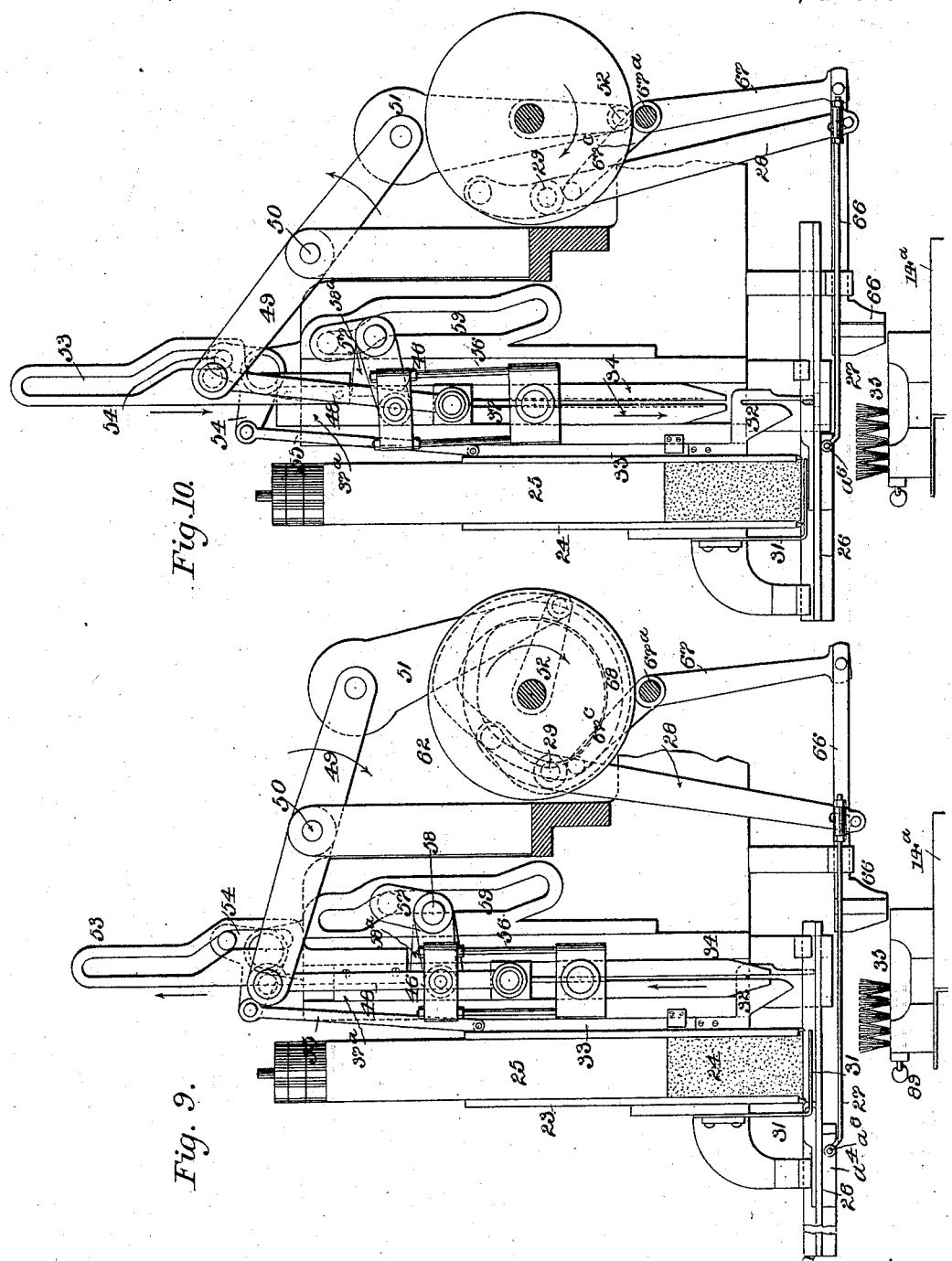
Witnesses
Arthur Ashley
F. S. Elmore
Inventor
McC. Young
By P. J. Dodge
Attorney

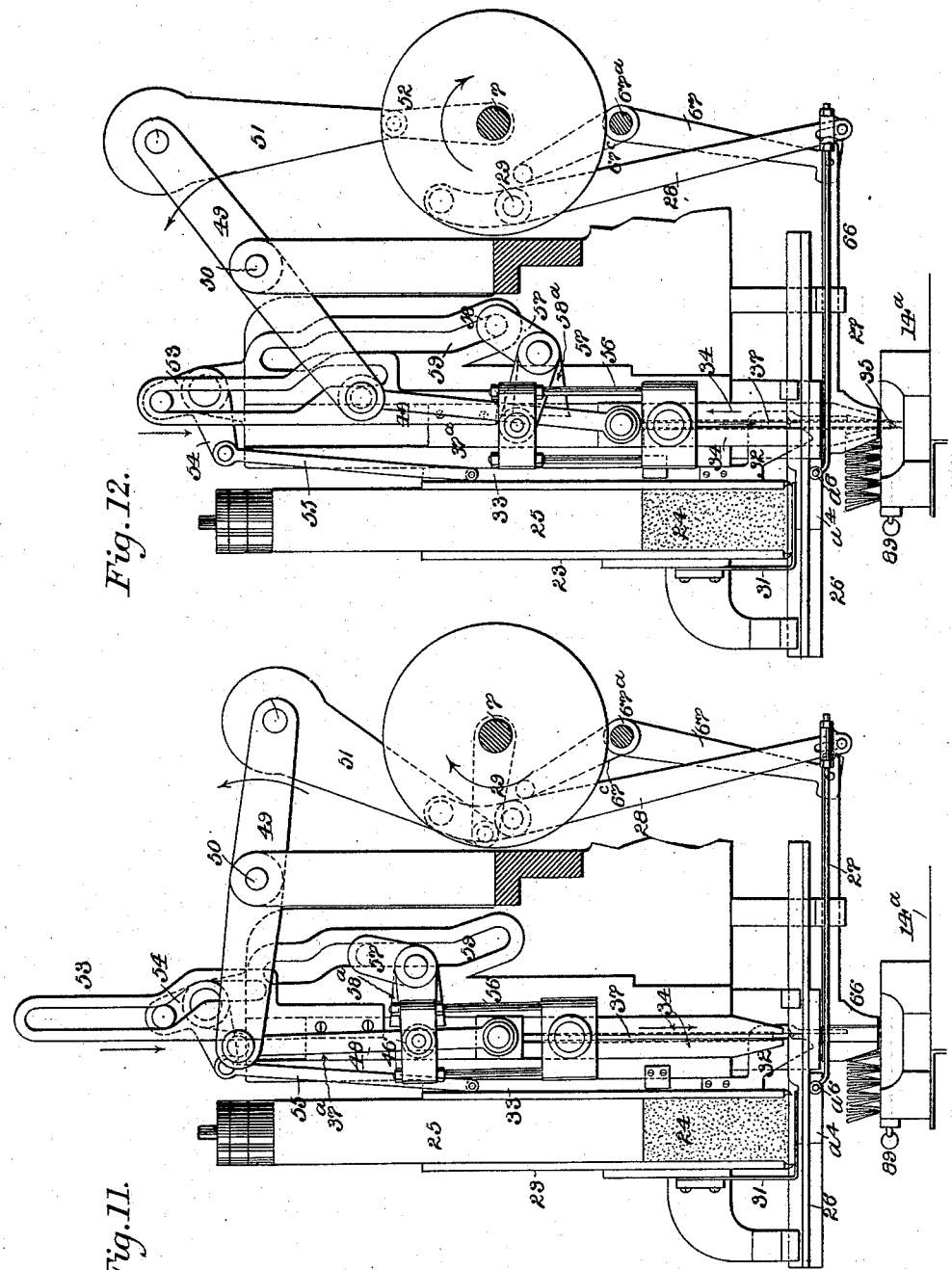

(No Model.)  13 Sheets—Sheet 10.

McCLINTOCK YOUNG.
BRUSH MACHINE.

No. 578,907. Patented Mar. 16, 1897.

on line 13–13 of Fig. 5.

on line 14–14 of figure 6.

WITNESSES:
Arthur Ashley
F. S. Elmore

INVENTOR
M. C. Young
BY
P. T. Dodge
ATTORNEY.

THE NORRIS PETERS CO., PHOTO-LITHO., WASHINGTON, D. C.

(No Model.)  McCLINTOCK YOUNG.  13 Sheets—Sheet 11.
BRUSH MACHINE.

No. 578,907.  Patented Mar. 16, 1897.

WITNESSES:
Arthur Ashley
G. S. Elmore

INVENTOR
McC. Young
BY
P. T. Dodge
ATTORNEY (No Model.) 13 Sheets—Sheet 12.
McCLINTOCK YOUNG.
BRUSH MACHINE.

No. 578,907. Patented Mar. 16, 1897.

Figure 18:
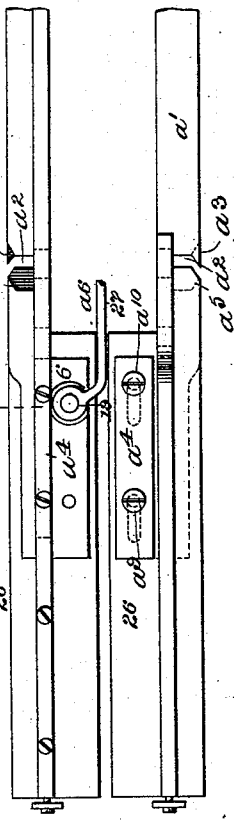

On line 19-19
of Fig. 18.

WITNESSES:
Arthur Ashley
L. M. Lamb

INVENTOR
McClintock Young
BY
P. T. Dodge
ATTORNEY.

(No Model.) 13 Sheets—Sheet 13.

McCLINTOCK YOUNG.
BRUSH MACHINE.

No. 578,907. Patented Mar. 16, 1897.

On line 24-24

WITNESSES:
Arthur Ashley
G. J. Elmor

INVENTOR
McClintock Young
BY
P. J. Dodge
ATTORNEY.

UNITED STATES PATENT OFFICE.

McCLINTOCK YOUNG, OF FREDERICK, MARYLAND, ASSIGNOR TO THE PALMETTO FIBER COMPANY, OF ILLINOIS.

BRUSH-MACHINE.

SPECIFICATION forming part of Letters Patent No. 578,907, dated March 16, 1897.

Application filed February 4, 1896. Serial No. 578,038. (No model.)

*To all whom it may concern:*

Be it known that I, McCLINTOCK YOUNG, of Frederick, county of Frederick, and State of Maryland, have invented a new and useful Improvement in Brush-Machines, of which the following is a specification.

This invention relates to brush-machines; and the invention consists in improved mechanism for boring the brush-block, separating the tufts to be inserted in the holes, forming the staples for securing the tufts in the holes, and driving the separated tufts and the staples to secure the former in place.

The invention also consists in the details of construction and combination of parts hereinafter described and claimed.

Figure 1:
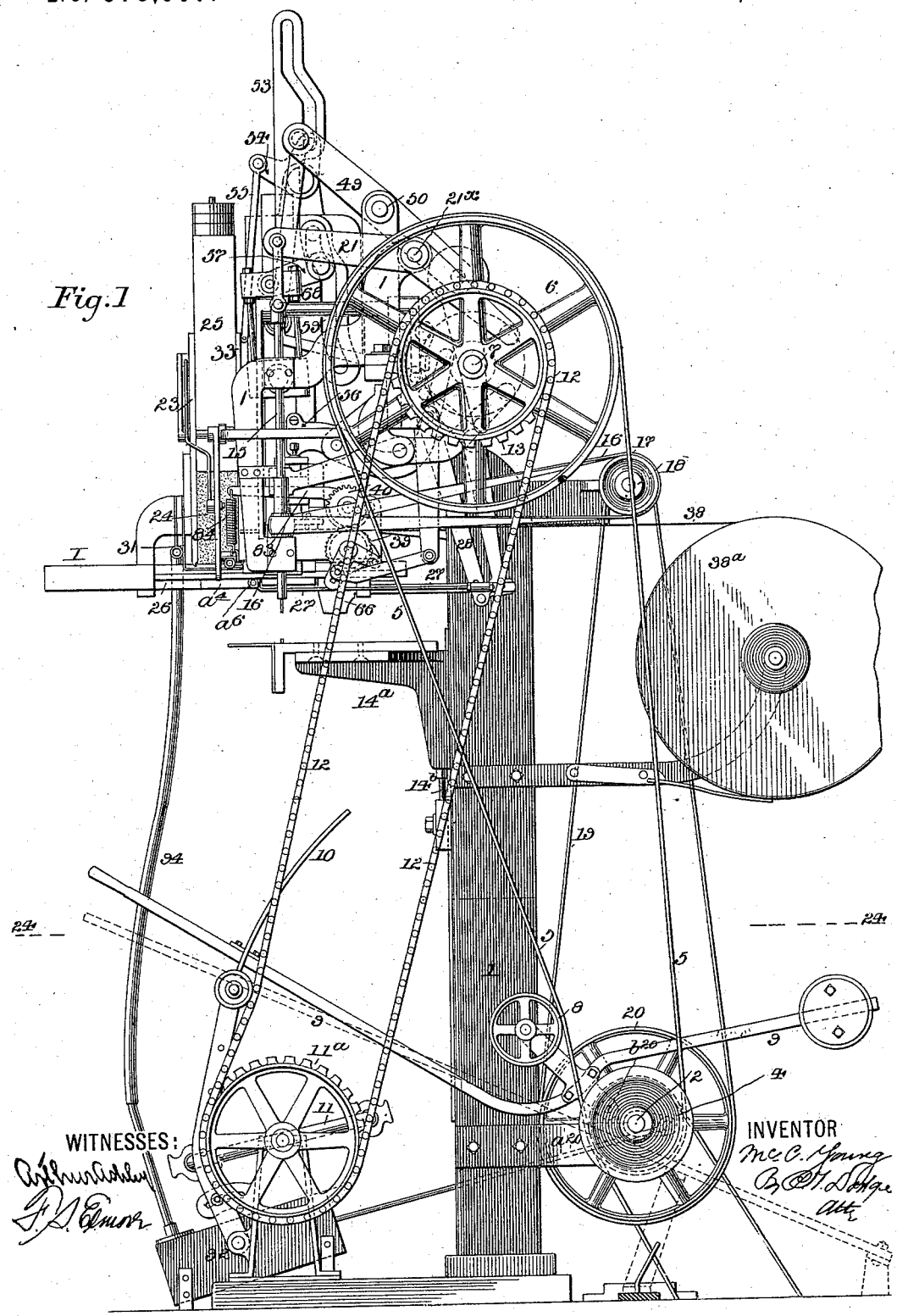
Figure 2:
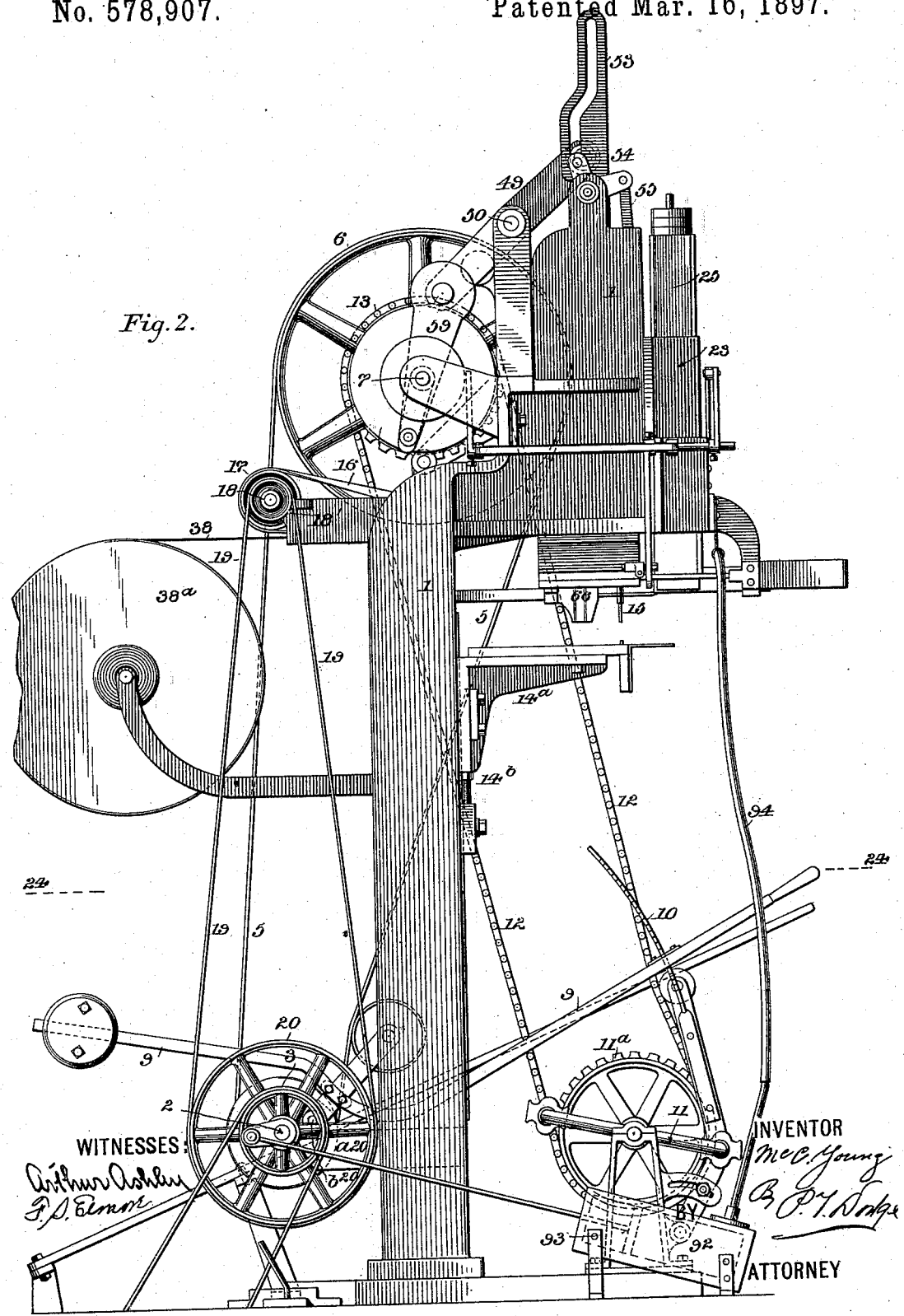
Figure 3:
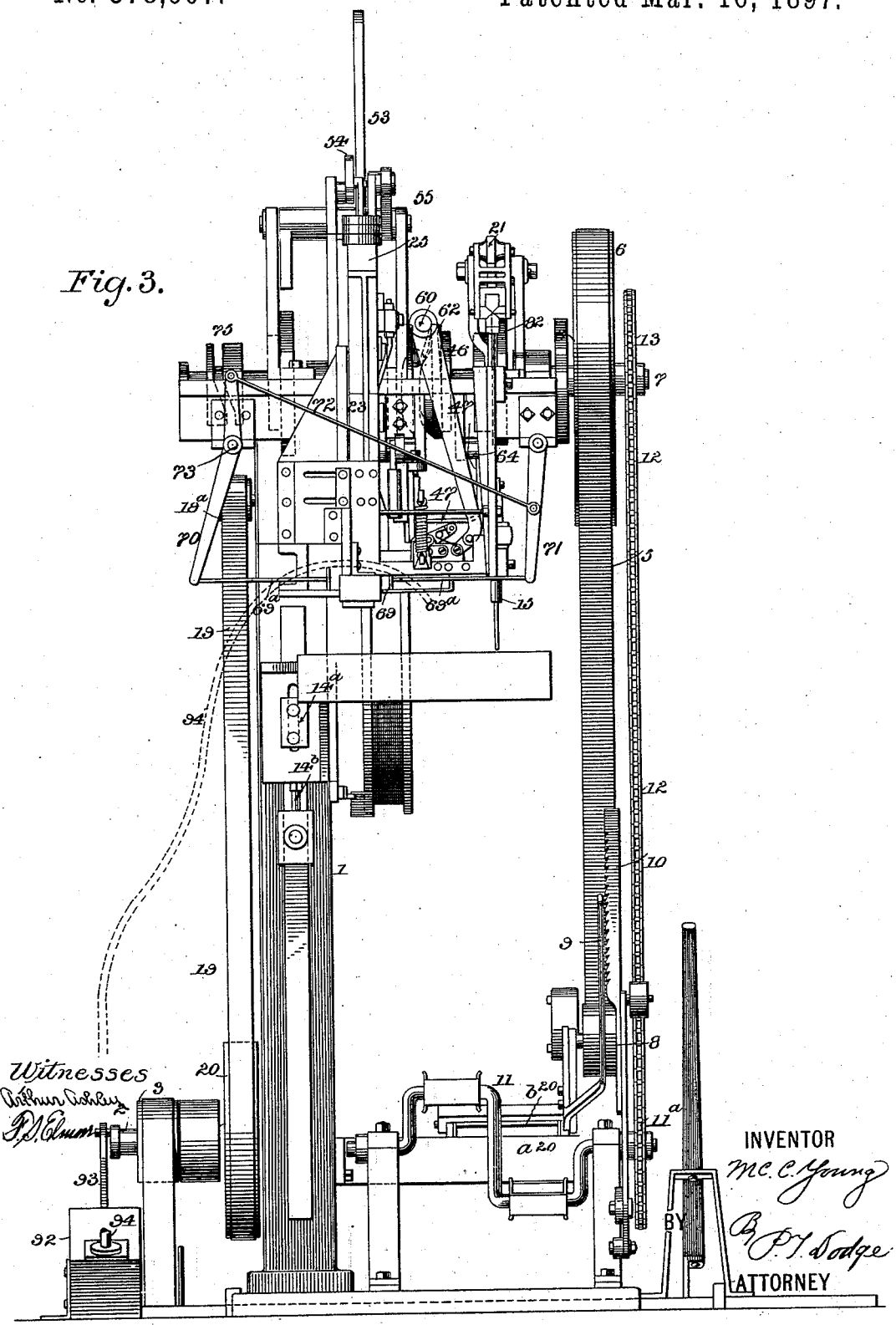
Figure 4:
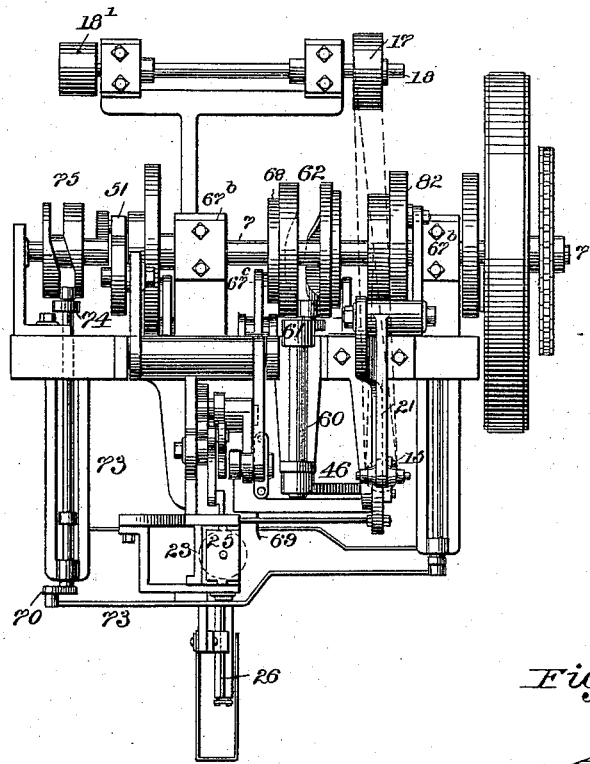
Figure 21:
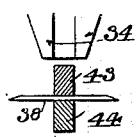
Figure 22:
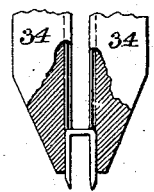
Figure 23:
Figure 13:
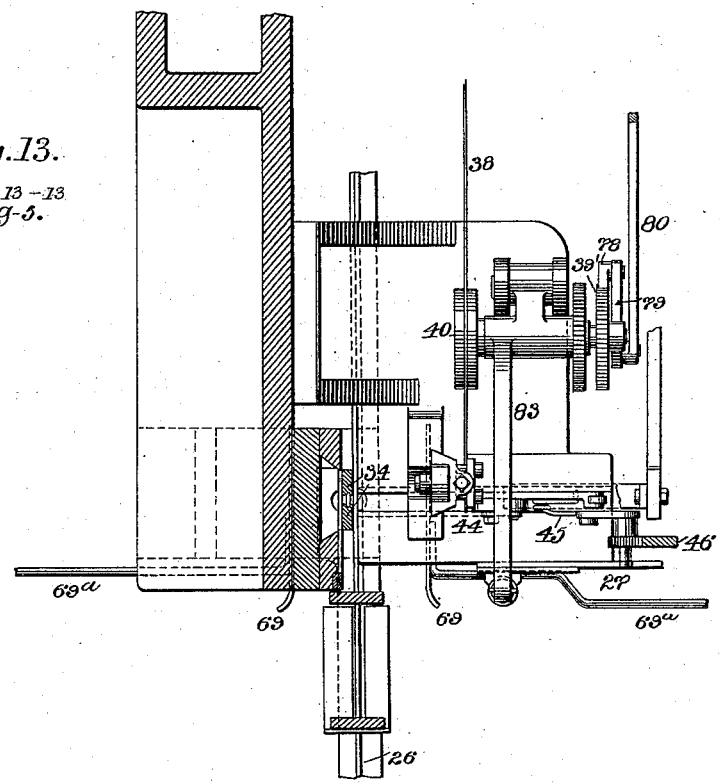
Figure 14:
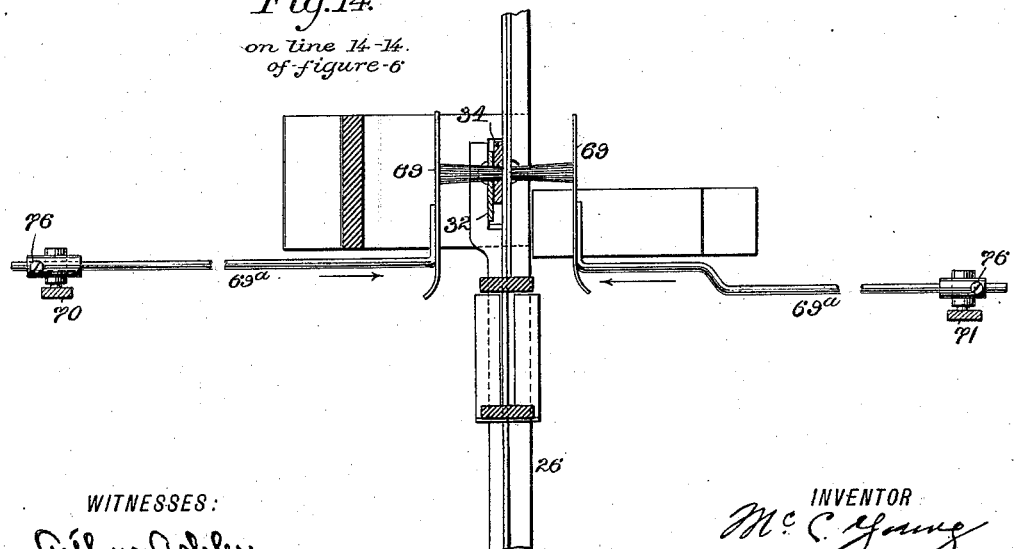
Figure 16:
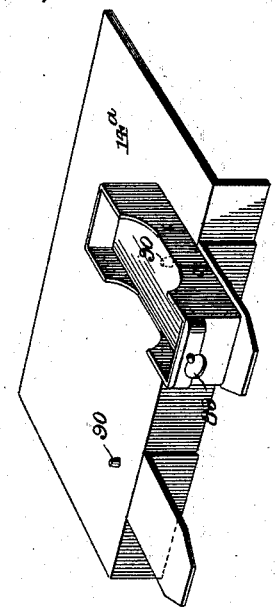
Figure 15:
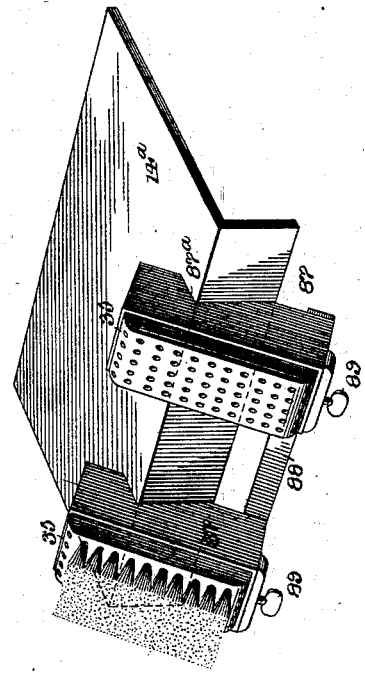
Figure 20:
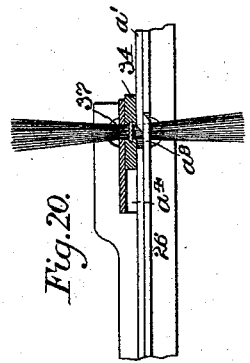
Figure 17:
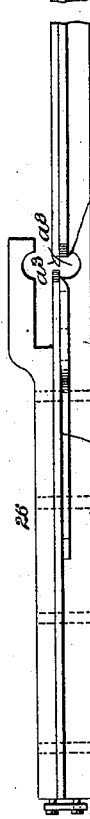
Figure 19:
Figure 19A:
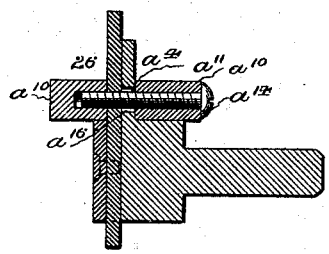
Figure 19B:
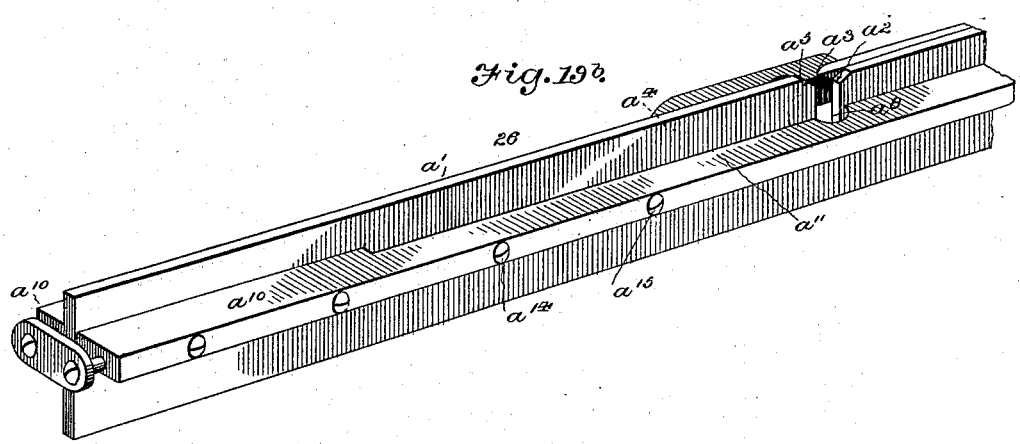
Figure 19C:
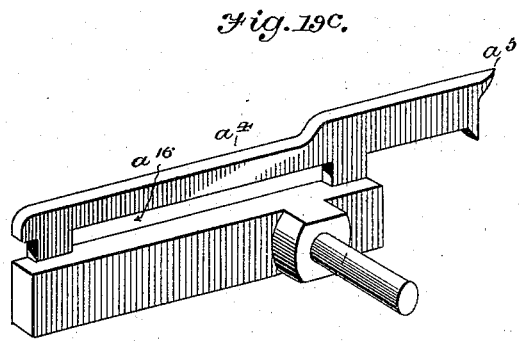
Figure 24:
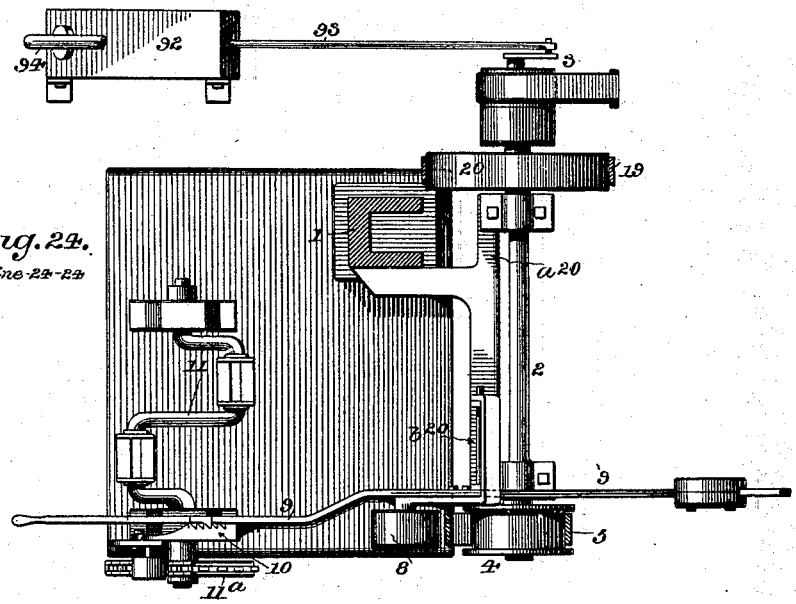
Figure 25:
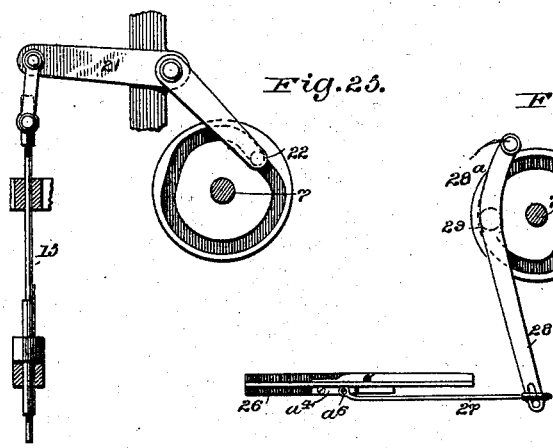
Figure 26:
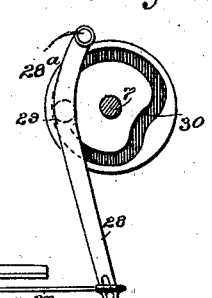
Figure 27:
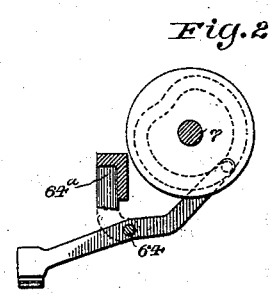
Figure 28:
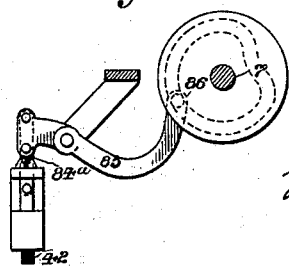

Referring to the drawings, Figure 1 is an elevation of the machine from the right-hand side. Fig. 2 is a similar view from the left-hand side. Fig. 3 is a front elevation. Fig. 4 is a plan view of the machine. Fig. 5 is an enlarged view of the wire feed and cutter and the tufting slide and driver. Fig. 6 is a sectional view on the line 6 6 of the previous view, showing the wire-cutter retracted. Fig. 7 is a detail showing the forward movement of the clamp to bring the wire into position to be formed into a staple by the plunger. Fig. 8 is a section on the line 9 9 of Fig. 6, showing a face view of the wire feed and cutter. Fig. $8^a$ is an elevation of the wire-severing mechanism and movable clamp on an enlarged scale. Fig. $8^b$ is a perspective view of the same. Fig. $8^c$ is a diagrammatic view showing the position which the wire occupies with relation to the anvil when severed by the knife. Figs. 9, 10, 11, and 12 are outline views showing the operation of the tufting-slide, the plunger, and connected parts during the revolution of the machine and illustrating the manner in which the tuft is set in the block. Fig. 13 is a plan view of the wire-feed on the line 13 13 of Fig. 5. Fig. 14 is a plan view on the line 14 14 of Fig. 6, illustrating the action of the device for evening the tuft before its insertion in the block. Fig. 15 is a perspective of the block-holding device. Fig. 16 is a similar view of a different form of the same. Fig. 17 is a top plan view of the tufting-slide. Fig. 18 is a side elevation of the same. Fig. 19 is an elevation of the same as viewed from the opposite side, the slide being shown in an inverted position. Fig. $19^a$ is a vertical transverse section through the tufting-slide on the line 19 19 of Fig. 18. Fig. $19^b$ is a perspective view of the main slide. Fig. $19^c$ is a perspective view of a shorter portion of the slide detached. Fig. 20 is a plan view of the tufting-slide with the tuft in position, showing the opening through which the tuft is forced into the block. Fig. 21 is a detailed view illustrating the manner in which the wire is presented to the staple-forming device. Fig. 22 is a similar view showing the manner of forming the staple; Fig. 23, a perspective view showing the manner in which the staple-driver is guided in the guiding-slide. Fig. 24 is a horizontal section as viewed from above on the line 24 24 of Figs. 1 and 2, showing the shafting and pulleys for operating and controlling the machine. Fig. 25 is a diagrammatic view showing the levers and cam for operating the boring-spindle. Fig. 26 is a similar view showing the levers and cam for operating the tufting-slide. Fig. 27 is a similar view showing the levers and cam for operating the clamp-controlling lever. Fig. 28 is a similar view of the levers and cam for operating the severing-knife.

Referring to the drawings, 1 represents a rigid main frame, which may be constructed in any form and of any material adapted to sustain the operative parts. Near the base the frame has arms $a^{20}$ and $b^{20}$ to sustain a horizontal driving-shaft 2, which is provided with pulley 3 to receive the driving-belt and with pulley 4, connected by belt 5 with pulley 6 on the end of a main shaft 7, which is mounted in the upper part of the main frame and provided with cams to operate the principal parts of the machine, as shown in Figs. 3 and 4. The belt 5 is kept under moderate tension by an idler-pulley 8 on a counterweighted lever 9, which is pivotally connected to the rigid arm $b^{20}$ of the main frame, as shown in Fig. 24, and which lever engages a toothed locking-bar 10. The motion of the main shaft 7 and the tuft forming and inserting devices is controlled by the feet of the attendant through a double-crank shaft 11, mounted in the base of the main frame and carrying a sprocket-wheel 11$^a$, connected by chain 12 with a wheel 13 on the main shaft. The cranks are provided with ordinary bicycle-pedals, and the attendant permits his feet to ride on them. When the main shaft is to be stopped or slowed, the attendant has only to exert a moderate resistance on the cranks to cause the slipping of the belt 5. When the resistance ceases, the parts start again automatically and instantly.

To sustain the brush-blocks during the operations of boring the same and inserting the tufts, the frame is provided with a shelf-bracket 14$^a$, attached by a sliding joint and sustained by a vertical adjusting-screw 14$^b$. Above this shelf in the main frame is the upright vertically-movable boring-spindle 15, having its pulley driven by belt 16 from pulley 17 on shaft 18, which carries a second pulley 18', driven by belt 19 from pulley 20 on the driving-shaft. The boring-spindle is moved vertically by lever 21, pivoted to the main frame, as at 21$^\times$, and connected to the spindle by a link and swivel and in its turn acted on by a cam 22 on the main shaft, as shown more particularly in Fig. 25, the cam being shaped to give a slow descent and a sudden rise to the boring-tool.

Passing now to the tufting mechanism, 23 represents an upright open-sided box in which the loose fibers 24 are laid *en masse*, subject to the pressure of the gravitating weight or follower 25. Beneath the box 24 there is a horizontally-sliding blade 26, designed to separate from the bottom of the mass the fibers for a tuft, gather them into compact shape, and carry them to the guiding and inserting devices. This gathering and carrying blade (shown in detail in Figs. 17 to 19$^c$) consists of two parts, a longer part $a$ and a shorter part $a^4$, mounted thereon and movable to a limited extent relatively thereto. The larger part is formed with a vertical rib $a'$ and a horizontal rail $a^{10}$, which is formed about midway of its length with a vertical slot $a^{11}$ at the side of the vertical rib, as shown more particularly in Fig. 19$^b$. The shorter part $a^4$ is extended through and seated in said slot to slide longitudinally of the longer part to a limited extent. It is confined in the slot, and its motion is limited by means of two screws $a^{14}$ and $a^{15}$, which are extended horizontally through the horizontal rail $a^{10}$ and into a slot $a^{16}$, formed in the shorter part $a^4$. The rib $a'$ on the longer part is provided with a notch $a^2$ in its top to admit the fibers and is formed with an overhanging lip $a^3$ to engage the overlying fibers and to throw them down into the notch as the blade moves forward. The shorter member $a^4$ is provided with a forwardly-extending lip $a^5$ to close over and clamp the fibers in the notch as this part is moved relatively to the longer part. Through the slide there is a vertical slot or opening $a^8$ to permit the downward passage of the tuft and the devices for driving it and its fastening-staple. From a stud $a^6$ on the shorter slide $a^4$ an operating-link 27 is extended and pivoted at its rear end to the lower end of a lever 28, which is pivoted at its upper end, as at 28$^a$, to the main frame and below the pivot carries a stud or roller 29, which is acted on by a cam 30 on the driving-shaft, as shown in Fig. 26. In action these parts impart a forward motion to the slide $a^4$ and through it to the main slide. During this movement the shorter part $a^4$ is at the extreme limit of its movement with relation to the part $a$, and the notch $a^2$ in the part $a$ is uncovered, and the open notch is filled with fiber. The motion is then reversed, and the short slide first closes the notch in the part $a$ and then carries the main slide 26 rearward until the bunch of fibers held thereby is presented over the hole in the brush-block, where the slide remains at rest for the time being.

To aid in sustaining the ends of the fibers, a fixed slotted plate 31, bolted to the front of the fiber-box 23, is extended backward under the fiber-box and along the sides of slide 26. The bunch or wisp of fiber is carried by the slide against the rear depending finger of a vertically-slotted stop-plate 32 on the lower end of a vertical slide 33, guided in the main frame. This stop-plate 32 descends through the slide 26, as in Figs. 11 and 12, and straddles the fiber still held in the notch and holds the same in position and compresses it into shape to be acted upon by the parts hereinafter described.

Above the slide there is a vertically-slotted vertical guiding-slide 34, which is adapted to be moved down, as in Fig. 12, astride of the wisp and through the slide to the brush-block 35, in order to form a guide for the descending wisp as it is doubled into a tuft and carried down into the block and also as a guide for the staple.

Within the slot of the guiding-slide 34 there is mounted the staple-driving slide 37, sliding in grooves in the inner walls of the slot. The blade is carried by a dovetail plate 37$^a$, sliding in a similar-shaped vertical groove in the main frame. When the guiding-slide descends, it acts upon the middle of the wisp and drives the same down through the opening in the slide 26, which acts to double or fold the ends upward over the driver, thus forming the tuft, which is driven home into the block by the following blade or driver. Before the tuft is thus formed and driven the fastening-staple must be formed and placed astride of the fibers beneath the driver. To this end the wire 38 is passed from a reel 38$^a$ between two intermitingly-driven feed-rolls 39 and 40, (shown in Figs. 5 and 8,) over an anvil 41, beneath a vertically-guided cutting-blade 42, as plainly shown in Figs. 8$^a$ and 8$^b$, and between the upper and lower jaws 43 44 of a sliding clamp, as shown in Figs. 6 and 7. The lower part of this clamp is connected by a link to a vibrating lever 46, which acts, as will be more fully described hereinafter, to carry the clamp bodily with the severed wire to form the staple held between its jaws to the left beneath the driving-blade and over the bunch of fibers. The upper jaw 44 of the clamp is pivoted to the lower jaw and is acted upon by a spring 45, which tends to hold the upper jaw against the lower jaw and close the clamp, so that it will retain and carry the end of the wire after it has been severed by the cutter 42, before alluded to. The upper jaw is acted upon and opened at the proper time for the admission of the wire by one end of a vertically-moving lever 47, as will be more fully described hereinafter. While the clamp is open and at a distance from the staple-driver, the wire is projected by the feed-rolls over the anvil, the edge of which extends at an angle to the wire, as shown in Fig. 8$^c$, into the clamp, which then closes. The cutter then descends and severs the wire in a line oblique to its longitudinal axis, thereby forming a sharp point, and the clamp advances to the left until the ends of the wire stand directly beneath the end of the slide 34, as shown in Figs. 7 and 21. This slide then descends astride of the clamp, acting on the two ends of the wire and bending them down over the sides of the lower jaw, thus forming a staple with its legs seated in the vertical grooves of slide 34 under the driving-blade. The clamp now opens and retreats to the right, leaving the staple in place. When the driver-blade 37 descends, it carries the staple down over the wisp and into the bight of the tuft as the latter is formed, the motion being continued until the tuft is carried to its place in the block and the staple seated tightly over it and into the wood.

Motion may be communicated to the several parts by any suitable driving connections, but I prefer the construction shown.

A dovetail plate 37$^a$, carrying the driving-blade 37, is connected by link 48, jointed to lever 49, pivoted at 50 in the main frame and connected by a heavy counterbalancing-link 51 to a crank 52 on the main shaft, whereby the blade 37 is moved upward and downward. This dovetail sliding plate is extended upward and provided at its upper end with a sinuous slot 53. As the blade reciprocates this slot imparts motion to one end of an elbow-lever 54, which is pivoted to the main frame and connected by link 55 to the slide 33, carrying the tuft arresting and compressing blade 32. The guiding-slide 34 is connected by a link 56 to one end of an elbow-lever 57, which is pivoted at 58 to an arm 58$^a$, projecting from the side of the dovetail plate 37$^a$, carrying the driving-blade 37. The upper end of this lever 57 has a stud projecting into a sinuous slot 59 is the main frame.

It will be seen that as the dovetail plate 37$^a$, which carries the blade 37, rises and falls it carries with it the lever 57 to operate the sliding guide, and while the blade and guide will move together for a portion of their stroke they will also move relatively to a limited extent by reason of the slot 59, which as the lever 57 is carried upward and downward by the movement of the blade will act to move said lever 57 on its axis and cause a relative movement of the blade and the guide carried thereby.

The clamp-shifting lever 46 is mounted on a rock-shaft 60, Figs. 4 and 6, extended horizontally through bearings in the main frame and operated through a crank 61 on its rear end, entering a slotted cam-wheel 62 on the driving-shaft. The lever 47 for opening and closing the clamp is mounted on a horizontal axis 64, carried by hangers 64$^a$, fixed to the main frame, as shown in Figs. 6 and 27, and is acted upon at its rear end by a cam 65 on the driving-shaft. To aid in forming and guiding the tuft, I provide a reciprocating arm 66, Figs. 5, 9, 10, 11, and 12, which arm is connected to a lever 67, which is connected to one end of a horizontal shaft 67$^a$, mounted in bearings 67$^b$ on the main frame. The opposite end of this shaft is provided with an arm 67$^c$, which is engaged and driven by a cam 68 on the main driving-shaft, as shown in Fig. 9. This slide retreats to permit the advance of the brush-block and to release the driven tuft, as shown in Figs. 9 and 10, and at the proper time previous to the descent of the tuft is carried forward, so that its vertical passage stands over the hole in the brush-block, as shown in Figs. 11 and 12. The slide just described is in the form of a casing, and when moved forward over the hole in the brush-block to receive the next tuft this casing will push the adjacent seated tufts and form a free path for the descending tuft, and in this way the latter will not engage or contact with the said tufts.

In order to secure the proper formation of the tuft, it is desirable that the fibers should be evened and adjusted endwise in proper relation to the blade, by which they are doubled or folded into a tuft. For this purpose I employ, as shown in detail in Fig. 14, two vertical blades 69 in such position that the fibers are carried between them by the slide 26. These blades have their carrying-arms 69$^a$ connected, respectively, to two depending arms 70 and 71, which are connected by a cross-rod 72, so that they are moved toward and from each other. The arm 70 has its supporting-shaft 73 carried rearward in the main frame and provided, as in Fig. 4, with a crank-arm 74, entering a slotted cam 75 on the main shaft.

It sometimes happens that it is desirable to have the ends of the tuft irregular. This is effected by folding or doubling the fibers at a point at one side of the middle. In order to effect this adjustment of the fibers in relation to the driving device, the adjusting-blades 69 have their arms connected adjustably to their levers, as shown in Fig. 14, through sockets and set-screws 76. This admits of the two blades being shifted to the right or left to determine the longitudinal adjustment of the fibers, as may be demanded.

The wire-feeding rolls 39 and 40 are geared together, as shown in Fig. 5, and the lower roll receives motion through a ratchet-wheel 39', secured to its arbor and driven by a dog 78 on a crank-lever 79, operated through link 80 from a lever 81, pivoted to the main frame, and carrying at its upper extremity a stud which enters a groove-cam on the main shaft. The upper roll 40 is carried by a lever 83, drawn downward into contact with the lower roll 39, by a spring 84, so that the wire is subjected to a yielding pressure. The wire-severing blade is actuated through a link 84$^a$ from lever 85, the rear end of which engages cam 86 on the main shaft, as shown in Fig. 28.

In operating the machine I treat the two brush-blocks in one operation, boring one while the other is being filled. In order that this may be done, I provide in any suitable form a clamp or holder for connecting the blocks. A simple form is shown in Fig. 15 and consists of two sockets 87, each adapted to receive a block and connected by a cross-bar 88, screws 89 or equivalent devices being provided to hold the block in position. The guiding of the two blocks to the two tools simultaneously may also be accomplished solely by hand and without the aid of the connecting-rod 88. To accomplish this, the bed or table will be provided, as shown in Fig. 16, with one or more studs 90, located, respectively, below the boring-tool and driver, and the sockets or block-holders will be provided on the under side with holes corresponding in location to the positions which the tufts are to occupy in the brush-block. It is only necessary, therefore, for the operator guiding the block-holders by hand to shift them about, allowing the studs to enter the holes in their under sides, respectively. This will determine the position of the two blocks at one time, so that the proper points will fall directly under the boring-tool and the driver, respectively. As the boring-tool is pressed automatically, it will form a hole in one block at the same time that a tuft is driven into the corresponding place in the other block. By these simple contrivances the operator is enabled to handle two blocks at one time, thus reducing the amount of labor required and increasing the output of the machine.

It will be noted that in Fig. 15 the holders are shown as being provided in their under sides with notches 87$^a$, which receive the edge of the table and sustain the holders in an inclined position. This construction is to provide for the boring and driving of the tufts in the edges of brush-blocks, which are rounded, as shown. In boring and tufting the flat portions of the block the holders are held in a horizontal position on the table.

In order to remove the shavings, I provide at the base of the machine a pump-cylinder 92, having its piston 93 connected to a crank on the driving-shaft, and from this cylinder I lead an air-pipe 94 to a point adjacent to the boring-tool, so that the chips and shavings are driven away as fast as they are formed.

Having thus described my invention, what I claim is—

1. In a brush-machine, the fiber-box in combination with the notched slide thereunder to separate a quantity of fibers to form a tuft, means for moving the slide under the box, the vertically-movable slotted slide, 32, to straddle the tuft, means for moving the said slide vertically, the slotted sliding guide 34, the driving-blade 37, means for moving said parts, a movable clamp adapted to grasp the wire to form a staple and present it beneath the guiding-slide, means for feeding the wire to the clamp and means for moving the latter, substantially as shown and described.

2. In a brush-machine the combination of a fiber separating and carrying blade, provided with a notch to gather a wisp of fiber and with a vertical opening adjacent to the notch to permit the downward passage of the fiber therethrough, and tuft-inserting mechanism adapted to carry the tuft downward through the blade.

3. In a brush-machine the combination with a wire-feeding mechanism of a movable clamp to receive a section of the wire, a movable slide adapted to bend a section of wire to form the staple and to retain the same temporarily, mechanism for moving the clamp with a section of the wire beneath the slide and means for driving the staple in the brush-block.

4. In a brush-machine the combination with a fiber-box of a reciprocating slide provided with a notch to separate a wisp of fiber to form a tuft, means for reciprocating said slide, a slotted slide 32 to straddle the separated tuft, a tuft-guide 66, means for reciprocating the same, wire feeding, cutting and carrying devices, a vertically-movable guiding-blade, a vertically-reciprocating driving-blade and means for operating said parts.

5. In a brush-machine the combination with the horizontally-movable notched slide adapted to separate a quantity of fibers to form a single tuft, of means for actuating the same, a vertically-movable fiber stop-plate having a depending finger adapted to be moved in the path of the separated tuft and formed with a slot to straddle the same, and means for securing said tuft in the brush-block.

6. In a brush-machine the combination of the driving-blade 37, of means for reciprocating the same, the lever 57 operatively connected to said blade to move bodily with the same, the guiding-slide 34 connected to the lever, and the fixed slotted frame engaged by the lever.

7. In a brush-machine the combination with the tuft separating and driving devices, of the wire-clamp movable bodily beneath the tuft-driving mechanism, means for feeding the wire to the clamp, means for cutting the wire and means for opening and closing said clamp to release and grasp the wire.

8. In a brush-machine the combination with the boring and tuft-inserting mechanisms and with means for driving said mechanisms simultaneously, of the support provided with studs, holders for the brush-blocks formed in their under sides with openings to receive the studs, and a device connecting and maintaining said holders fixedly with relation to each other a distance apart corresponding to the distance between the boring and tuft-inserting mechanisms.

9. In a brush-machine and in combination with the main frame, a belt-driven driving-pulley, 6, sustained thereby, a crank-shaft provided with pedals, a sprocket-wheel connected to said shaft, a second sprocket-wheel connected to the driving-pulley and a chain connecting said sprocket-wheels.

10. In a brush-machine and in combination with a tuft-driving device, means for operating it, a tuft guide or casing 66, movable in a direction transversely of the movement of the tuft-driver, and means for reciprocating the casing.

11. The combination with a boring mechanism of a tuft-inserting mechanism, means for operating said mechanisms simultaneously, a single supporting-table for the brush-blocks arranged beneath said mechanisms, two gage pins or stops fixed to the upper side of said table adjacent respectively to the said mechanisms, and two holders for the brush-blocks formed in their under sides to coöperate respectively with said gage pins or stops, substantially as described.

In testimony whereof I hereunto set my hand, this 30th day of January, 1896, in the presence of two attesting witnesses.

McCLINTOCK YOUNG.

Witnesses:
MARSHALL FOUT,
GEORGE BINLY.